March 22, 1966  G. H. HOWING  3,241,380
WORK HANDLING MECHANISM

Filed Sept. 20, 1963  2 Sheets-Sheet 1

INVENTOR.
GEORGE H. HOWING
BY
Richard W. Treverton
ATTORNEY

March 22, 1966   G. H. HOWING   3,241,380
WORK HANDLING MECHANISM
Filed Sept. 20, 1963   2 Sheets-Sheet 2

United States Patent Office 3,241,380
Patented Mar. 22, 1966

3,241,380
WORK HANDLING MECHANISM
George H. Howing, Rochester, N.Y., assignor to The Gleason Works, Rochester, N.Y., a corporation of New York
Filed Sept. 20, 1963, Ser. No. 310,319
2 Claims. (Cl. 74—20)

The present invention relates to a work handling mechanism, for loading a gear cutting machine or the like. The primary object is a simple and rugged mechanism operable by a single reciprocating motor and adapted to smoothly and rapidly carry out the motions required to engage by axial motion a workpiece on a magazine, swing it into alignment with a chuck on the machine work spindle, move it axially into the chuck, and then return for another workpiece.

A mechanism according to the invention comprises a housing, a driver journaled for rotation in the housing, said driver having a drive pin radially offset from its rotation axis and also having a cam path with helical end sections extending in opposite axial directions from an intermediate dwell section, a work-carrying arm secured to a shaft journaled in the housing for rotation about an axis parallel to that of the driver and also for axial motion, an element having an open-ended substantially radial guide slot for said pin and keyed to said shaft for rotation therewith and for axial motion relative thereto, a follower for said cam path mounted on said shaft for reciprocation therewith and rotation relative thereto, said pin engaging in said guide slot only during the arc of rotation of the driver in which said follower engages said intermediate section of said cam path, interengaging formations on said driver and element for holding said element against rotation during the arcs of rotation of the driver in which the pin is disengaged from said guide slot, a guide on the housing engaging said element for supporting it against motion along the axis of said shaft, a guide on the housing parallel to said axes and engaging said follower for holding it against rotation about the last-mentioned axis, and means for effecting reversing rotation of the driver through an angle sufficient to cause both of said end sections and said intermediate section of the cam path to traverse said follower, whereby during each cycle of operation the work-carrying arm will be reciprocated axially, with each stroke of such reciprocation interrupted by a rotation which is in opposite directions during opposite axial strokes.

A preferred embodiment of the invention is shown in the accompanying drawings, wherein.

Figure 3:
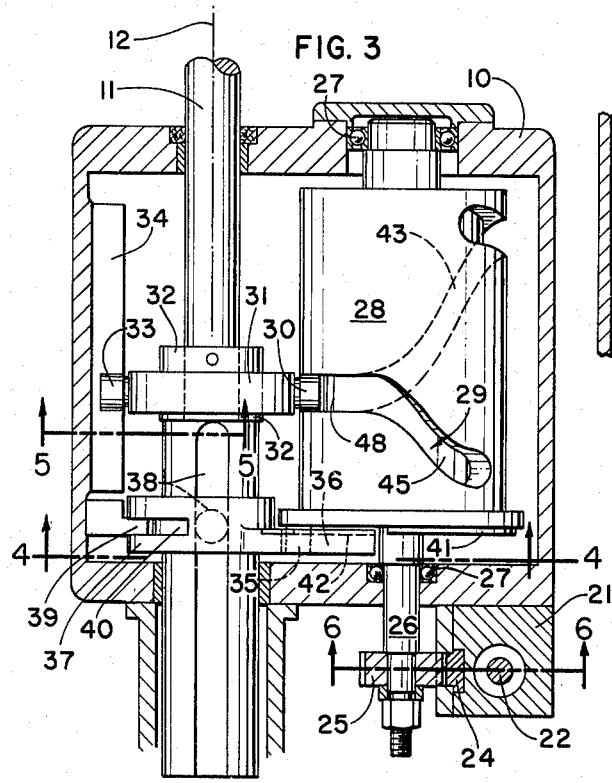
FIG. 3 is a plan sectional view in plane 3—3 of FIG. 2.
Figure 4:
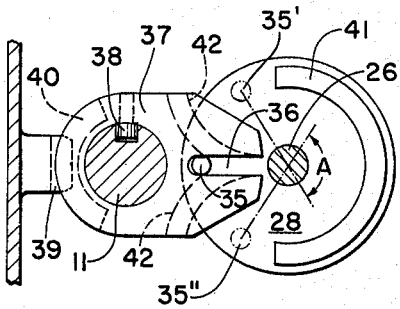
Figure 5:
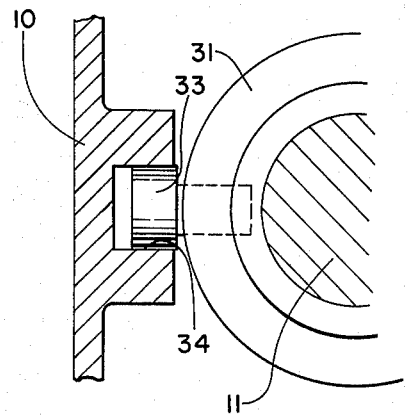
Figure 6:
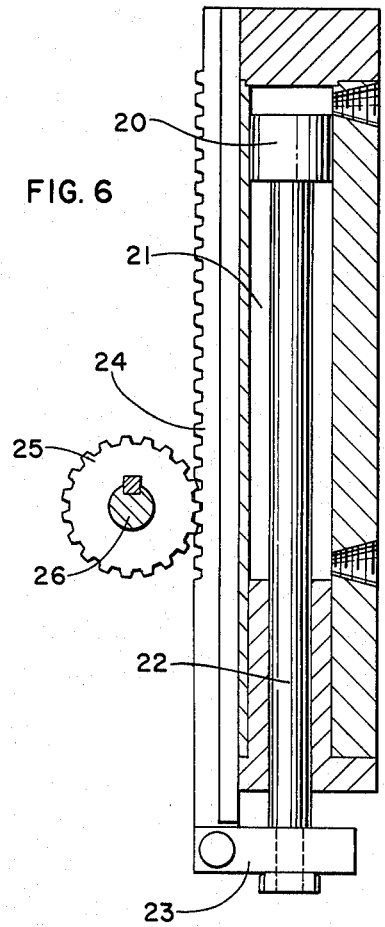
Figure 7:
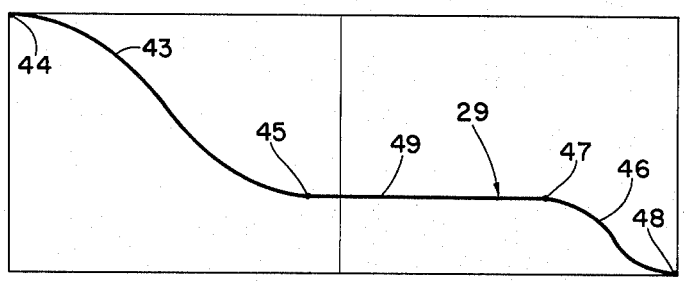

FIGS. 4, 5 and 6 are detail vertical sectional views, respectively in planes 4—4, 5—5 and 6—6 of FIG. 3; and, FIG. 7 is a plane development of the cam shown in FIG. 3.

Figure 1:
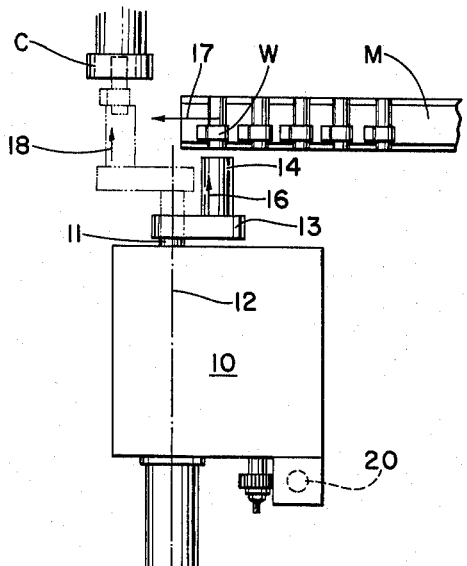
FIGS. 1 and 2 are respectively a plan view and a front view of the mechanism, showing its relation to the magazine and the work chuck of the machine.
Figure 2:
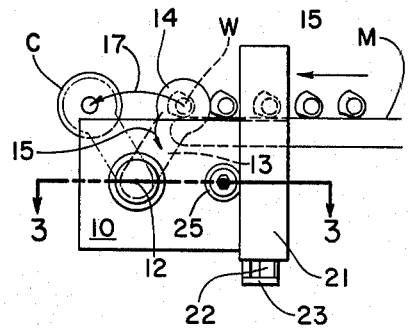

Referring to FIGS. 1 and 2, the mechanism comprises a housing 10 journaling a shaft 11 for angular and axial motion around and along its axis 12. An arm 13 secured to the shaft has a work-engaging device 14, for receiving and gripping a workpiece W. The device may be of any suitable form, either spring or fluid pressure actuated, depending upon the shape of the workpiece. In the illustration the workpieces are automobile steering gear sectors whose teeth are to be cut by the machine. In the arrangement shown they are carried by a magazine M of the endless belt type whose stepwise advance in the direction of arrow 15, FIG. 2, brings them successively into alignment with the work engaging device 14.

The purpose of the mechanism in housing 10 now to be described is to (a) advance the arm 13 along axis 12, i.e. in the direction of arrow 16, FIG. 1, to cause device 14 to receive a workpiece, (b) swing the arm about axis 12, as indicated by arrows 17 in FIGS. 1 and 2, to align the workpiece with chuck C on the work spindle of the machine, (c) again advance the arm axially, as indicated by arrow 18, FIG. 1, to place the workpiece in the chuck and then, upon closing of the chuck, to retrace motions (c), (b) and (a) in preparation for a repetition of the cycle after the magazine M has advanced one step and the workpiece in chuck C has been cut and then ejected.

Referring to FIGS. 3 to 6, the mechanism comprises a piston 20 reciprocable in a cylinder 21 in the housing and connected by piston rod 22 and cross-head 23 to a rack gear 24 which is slidably supported by the cylinder member. A pinion 25 meshing with the rack is secured to a shaft 26 that is parallel to shaft 11 and is supported for rotation in the housing 10 on radial and axial thrust bearings 27. A barrel cam 28 affixed to shaft 11 has a grooved cam path 29 engaged by pin 30, or preferably a roller supported by a pin, constituting a part of a cam follower 31. Shaft 11 is rotatable in the follower which itself is confined between collars 32 on the shaft against relative axial motion. Another pin or roller 33 of follower 31 is engaged in a guide groove 34 which extends along a wall of housing 10 in a direction parallel to shaft 11, to hold the follower against rotation about axis 12.

A drive pin or roller 35 projecting from one end face of the cam is engageable in an open ended radial slot 36 in an element 37 that is keyed at 38 to the shaft 11 for rotation therewith. The key connection, comprising a roller on slotted element 37 engaging in a key groove in the shaft, permits the shaft to move axially relative to the element which itself is held against axial motion in housing 10. For this purpose a lug 39 on the adjacent wall of the housing engages in an arcuate groove 40 in the periphery of the element. The pin 35 is engaged in radial slot 36 while the cam 28 and drive pin 35, which together constitue the driver of the mechanism, moves through angle A, FIG. 4, i.e. between the positions of the pin 35, shown in broken lines, which are designated 35′ and 35″, respectively. As the cam rotates the pin enters tangentially into the open outer end of the slot, turns the assembly 37, 11, 13 through an angle about axis 12 and then departs tangentially from the outer end of the slot. At all times when the pin 35 is out of the slot 36 an arcuate rib 41 on cam 28 engages in one or the other of two arcuate grooves 42 in element 37, to hold the latter against rotation.

Referring to FIGS. 3 and 7, the cam path 29 comprises a helical end section 43 between points 44 and 45, an opposite helical end section 46 between points 47 and 48, and an intermediate dwell section 49 between points 45 and 47. The phase relation between drive pin 35 and cam path 29 is such that the pin is engaged in slot 36 only when follower pin 30 is engaged in dwell section 49 of the cam path. Accordingly upon each down stroke of piston 20 the driver 28, 35 is rotated clockwise through one turn to successively (a) cause cam section 46 to advance the shaft arm assembly 11, 13 axially in direction 16 while rib 41 engages in a groove 42 to hold the assembly against rotation, then (b) cause cam dwell section 49 to hold the assembly against rotation while pin 35 acting in slot 36 rotates it through arc 17, and then (c) cause cam section 43 to advance the assembly axially, in direction 18, while rib 41 engages in the other groove 42 to hold the assembly against rotation. Upon the subsequent up-stroke of the piston the shaft-arm assembly is caused to retrace these steps (c), (b), (a).

The helical end sections 43 and 46 of the cam path are of gradually changing axial lead, so that the work-carrying arm assembly 31, 11, 13 is smoothly accelerated between each start and stop of its axial reciprocation, despite rapid reversing rotation of cam 28 by fluid motor 20, 21. The tangential entry and departure of pin 35 into and from radial slot 36 assures smooth acceleration of the assembly between each start and stop of its angular motion.

The piston 20 is preferably actuated by hydraulic fluid controlled by a reversing valve whose operation may be coordinated in a known manner with the cutting cycle of the machine and the stepwise advance of the magazine M.

Having now described the preferred form of the mechanism and its operation, what I claim as my invention is:

1. A work handling mechanism for a gear machine or the like comprising a housing, a driver journaled for rotation in the housing, said driver having a drive pin radial offset from its rotation axis and also having a cam path with helical end sections extending in opposite axial directions from an intermediate dwell section, a work-carrying arm secured to a shaft journaled in the housing for rotation about an axis parallel to that of the driver and also for axial motion, an element having an open-ended substantially radial guide slot for said pin and keyed to said shaft for rotation therewith and for axial motion relative thereto, a follower for said cam path mounted on said shaft for reciprocation therewith and rotation relative thereto, said pin engaging in said guide slot only during the arc of rotation of the driver in which said follower engages said intermediate section of said cam path, interengaging formations on said driver and element for holding said element against rotation during the arcs of rotation of the driver in which the pin is disengaged from said guide slot, a guide on the housing engaging said element for supporting it against motion along the axis of said shaft, a guide on the housing parallel to said axes and engaging said follower for holding it against rotation about the last-mentioned axis, and means for effecting reversing rotation of the driver through an angle sufficient to cause both of said end sections and said intermediate section of the cam path to traverse said follower, whereby during each cycle of operation the work-carrying arm will be reciprocated axially, with each stroke of such reciprocation interrupted by a rotation which is in opposite directions during opposite axial strokes.

2. A mechanism according to claim 1 in which said means comprise a pinion secured to said driver for rotation therewith, a rack engaging said pinion, and a fluid-pressure operable piston connected to the rack for reciprocation in unison therewith.

References Cited by the Examiner
UNITED STATES PATENTS 2,834,258  5/1958  Anderson et al. _____ 90—1
2,974,811  3/1961  Dammert et al. _____ 214—1

BROUGHTON G. DURHAM, *Primary Examiner.*

FRELING E. BAKER, *Examiner.*